United States Patent [19]

Anderson

[11] Patent Number: 4,883,729
[45] Date of Patent: Nov. 28, 1989

[54] BATTERY TERMINAL LOCKING ASSEMBLY

[75] Inventor: Ronald C. Anderson, Alachua, Fla.

[73] Assignee: Gates Energy Product, Inc., Gainesville, Fla.

[21] Appl. No.: 189,076

[22] Filed: May 2, 1988

[51] Int. Cl.$^4$ ............................................. H01M 2/30
[52] U.S. Cl. .................................... 429/179; 429/182; 429/183
[58] Field of Search ............... 429/178, 179, 182, 183, 429/186, 101

[56] References Cited

U.S. PATENT DOCUMENTS

| | | | |
|---|---|---|---|
| 4,053,693 | 10/1977 | Munch et al. | 429/183 |
| 4,224,388 | 9/1980 | Stadnick | 429/183 X |
| 4,241,152 | 12/1980 | Klink | 429/183 X |
| 4,517,264 | 5/1985 | Miller | 429/163 |
| 4,546,054 | 10/1985 | Carr et al. | 429/101 |

Primary Examiner—Anthony Skapars
Attorney, Agent, or Firm—Jack E. Ebel; C. H. Castleman, Jr.; H. W. Oberg, Jr.

[57] ABSTRACT

An assembly for preventing a battery terminal from rotating with respect to a battery container. The assembly is comprised of a collar having an aperture therethrough and a washer having an aperture therethrough which has a configuration substantially similar to the cross sectional configuration of a threaded portion of the terminal. The annular collar defines two faces having separate sockets formed therein. At least one nut is mated with the threaded portion of the terminal to releasably secure the washer within the socket formed in one face of the collar. The collar and washer cooperate to maintain the terminal and the container in a set position.

10 Claims, 2 Drawing Sheets

BATTERY TERMINAL LOCKING ASSEMBLY

BACKGROUND OF THE INVENTION

The present invention relates to an assembly for preventing a battery terminal from rotating with respect to the housing of the battery, and more particularly, to an assembly for locking a terminal of a metal gas cell, such as a nickel hydrogen battery, against rotation with respect to a container through which the terminal extends.

As employed in metal gas cells, an electrode plate stack is housed within a container holding fluid at an elevated pressure. Each end of the plate stack is connected to a separate elongated terminal by suitable leads. Each terminal exits the container at opposite ends thereof. A teflon compression feed through seal is conventionally positioned between the container and terminal to seal against fluid leakage. However, as assembled, the terminal is capable of rotating with respect to the container thereby exposing the leads, and accordingly the cell, to premature failure.

In an attempt to prevent terminal rotation, terminals have been provided with two substantially parallel surfaces at the unsecured end thereof and adjacent a threaded portion. Once a metal gas cell is assembled, a nut is mated with the threaded portion of a terminal and is torqued into contact with an insulative washer positioned between the nut and the container while the terminal is secured against rotation by engaging both surfaces with any suitable means, for example a wrench. However, excessive torque applied to the nut can cause damage to the leads and, the necessity of including such surfaces increases the length and weight of a metal gas cell. In addition, lack of adequate space in a confined area may hinder or prevent holding a terminal against rotation so as to connect a plurality of cells by means of bus bars and poses a safety hazard due to the possibility of a manually manipulated wrench accidentally engaging the terminals of two separate cells.

Accordingly, it is an object of the present invention to provide an assembly for preventing the terminal of a battery from rotating with respect to the housing of a battery which has a relatively simple construction, is lightweight, and can be releasably secured to the terminal and battery housing without damage thereto and does not necessitate increasing the length of terminal.

It is another object of the present invention to provide an assembly for locking the terminal of a metal gas cell against rotation with respect to the cell container which does not require the terminal to be secured against rotation during assembly.

SUMMARY OF THE INVENTION

To achieve the foregoing and other objects, and in accordance with the purposes of the present invention, as embodied and broadly described herein, one characterization of the present invention comprises an assembly for locking a battery terminal against rotation with respect to a container from which the terminal extends. The assembly comprises a first member for registering with and engaging the container, a second member for registering with and engaging the terminal, and a separate member for releasably securing the first member to the second member such that the first member and second member are engaged and cooperate to maintain the terminal and the container in a set position.

BRIEF DESCRIPTION OF THE DRAWINGS

The accompanying drawings, which are incorporated in and form a part of the specification, illustrate the embodiments of the present invention and, together with the description, serve to explain the principals of the invention. In the drawings.

THE DETAILED DESCRIPTION OF THE PREFERRED EMBODIMENTS

Figure 1:
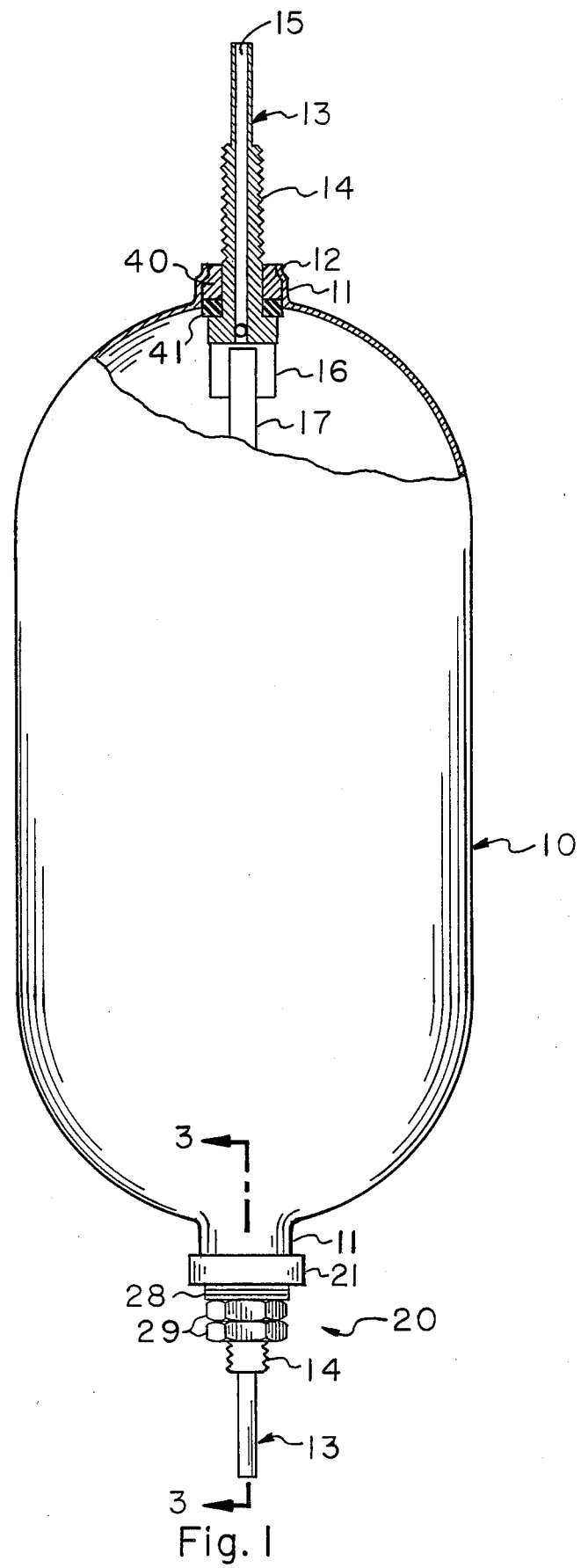
FIG. 1 is a partially cut away, partially cross-sectional pictorial view depicting the locking assembly of the present invention as fully assembled on one terminal of a battery, such as a metal gas battery.

Referring now to FIG. 1, the terminal locking assembly of the present invention is illustrated generally as 20 as fully assembled on a battery terminal 13 and a neck portion 11 of a battery container 10, such as a pressure container for a nickel hydrogen battery. Container 10 can be constructed of any suitable metal, such as Inconel nickel based alloys manufactured by the International Nickel Company. Each neck portion 11 has a generally hollow cylindrical configuration through which a terminal 13 is inserted. Each terminal 13 is provided with a teflon compression feed through seal 40 and an insulating collar 41 to seal the container 10 against fluid leakage. Each terminal is attached to one end of a electrode plate stack utilized in metal gas cells by means of a lead 17 and is provided with an axial port 15 which permits a pressure container to be charged with fluid.

Figure 3:
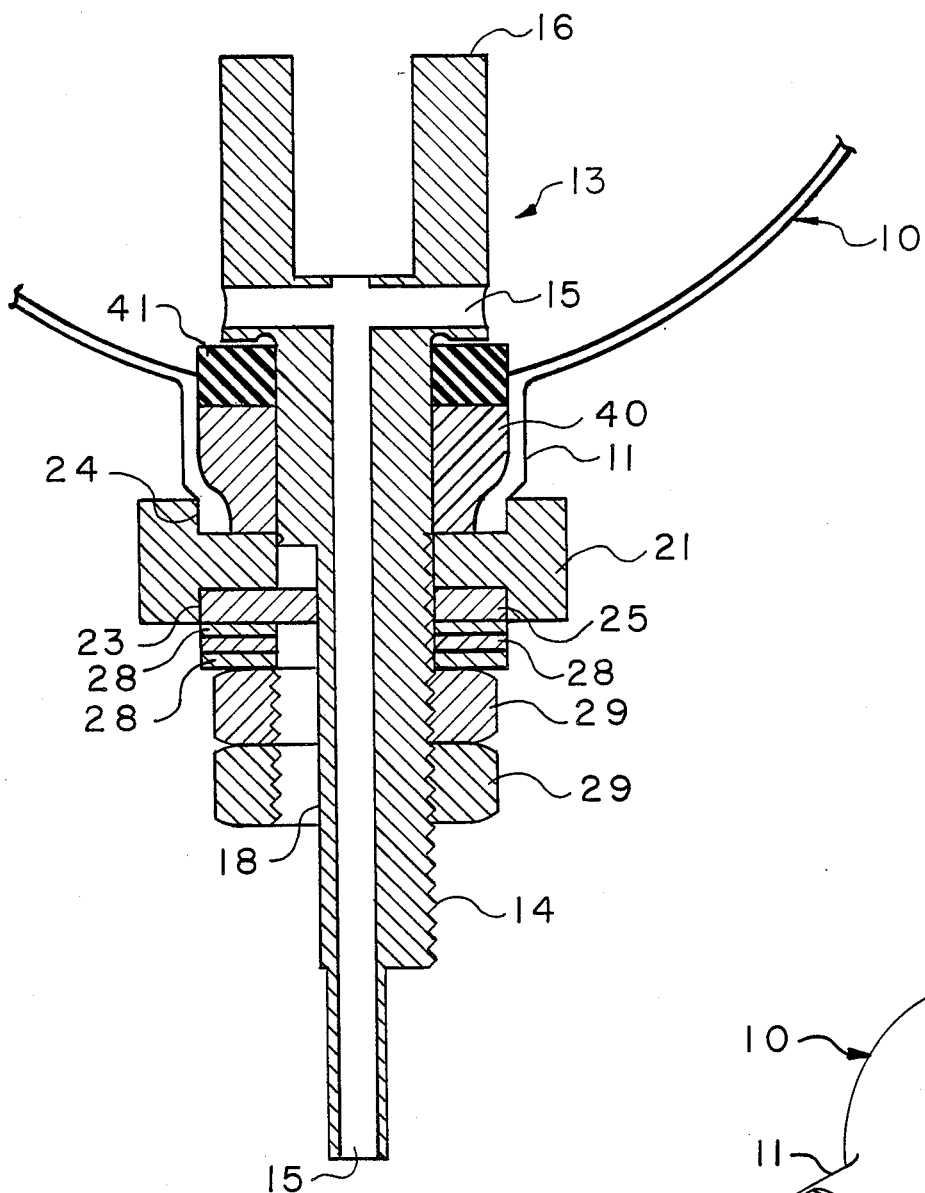
FIG. 3 is a cross-sectional view of the locking assembly of the present invention as fully assembled taken along line 3—3 of FIG. I.
Figure 2:
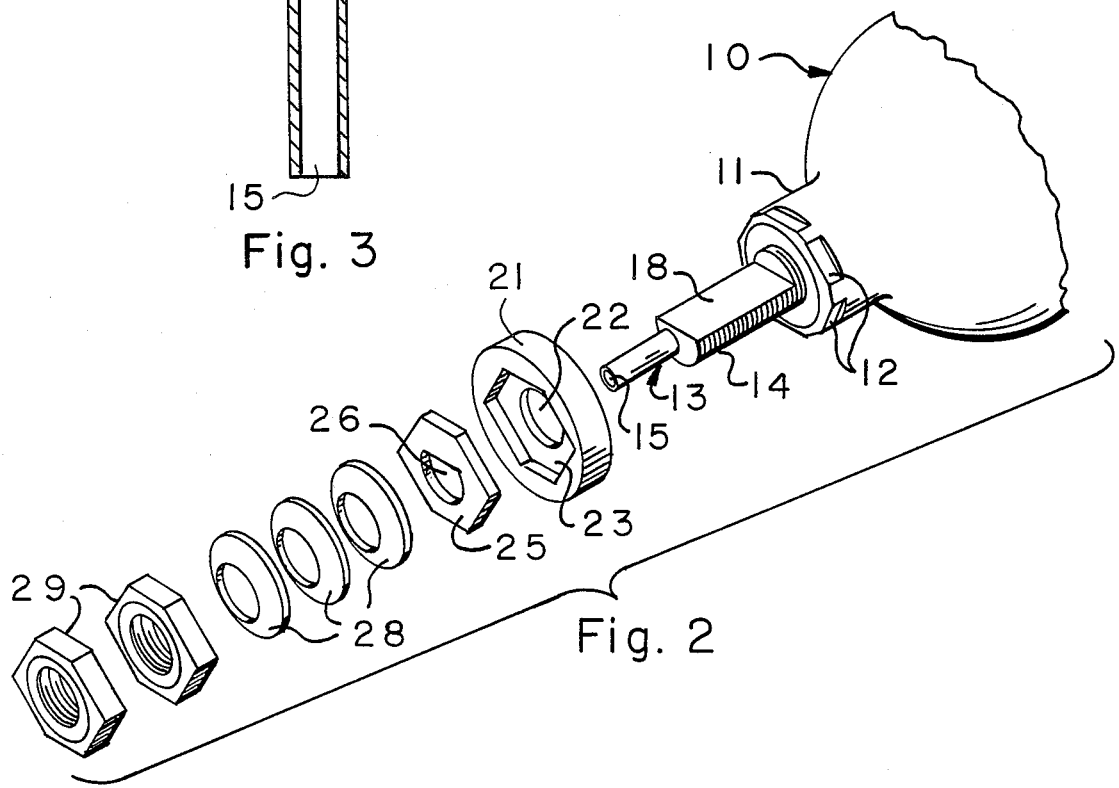
FIG. 2 is an exploded pictorial view of the components of the locking assembly of the present invention as arranged for assembly onto a terminal end and the neck portion of a battery container from which the terminal extends.

As illustrated in greater detail in FIGS. 2 and 3, the portion of each terminal 13 which extends outwardly from neck 11 is provided with a threaded portion 14. Threaded portion 14 has a relatively flat surface 18 formed therein and extending substantially the entire length of threaded portion 14. A substantially annular portion of each terminal 13 extends outwardly beyond threaded portion 14 to permit port 15 to be sealed once the battery is fully charged by any suitable means, such as by crimping and welding. As best illustrated in FIG. 2, neck 11 is indexed by a plurality of facets 12 which are formed in and are substantially uniformly and circumferentially spaced about the outer periphery of neck 11.

Locking assembly 20 comprises a collar 21, a washer 25, a plurality of belleville washers 28, and at least one nut 29. Collar 21 has an axially aligned aperture 22 extending therethrough. Sockets 23 and 24 are formed in separate faces of collar 21 and have generally polygonal peripheral configurations, for example hexagonal, as illustrated. Washer 25 has a peripheral configuration which substantially corresponds to that of socket 23 and is sized to mate and register with socket 23. Washer 25 has an aperture 26 which has a configuration which corresponds to the cross sectional configuration of threaded portion 14, including surface 18 (semi-circular as illustrated) and is sized to permit insertion of threaded portion 14 therethrough. Although illustrated as having a semicircular cross section, threaded portion 14 may have any sectorial cross sectional configuration. As utilized throughout this specification, the term "sectorial" is not limited to but is meant to include the portion of a circle defined by one of the intercepted arcs greater than or equal to 180° between two radii and any contour which connects the ends of the one arc together, indexes threaded portion 14, and does not prevent nuts 29 from being mated with threaded portion 14. Collar 21 can be constructed of any suitable lightweight, electrically non conductive material, for example fiberglass, which has sufficient rigidity to withstand the compression and torque applied thereto and electrically insulates container 10 from terminal 13. In addition, the material employed to construct collar 21 is softer than the metal of container 10 so as not to mar container 10. Washer 25 is preferably constructed of steel.

Collar 21 is assembled onto and interlocked with container 10 by passing terminal 13 through aperture 22 until facets 12 register with and are engaged within socket 24. As thus assembled, collar 21 is prevented from rotating relative to container 10. Washer 25 is assembled by registering, mating, and interlocking aperture 26 with threaded portion 14 so as to prevent relative rotation of washer 25 and terminal 13. Washer 25 is then inserted within socket 23. Belleville washers 28 are positioned on terminal 13 and function by expansion and compression to compensate for any movement of terminal 13 with respect to collar 21 and washer 25 which is caused by expansion or contraction of container 10. Nuts 29 are subsequently mated with threaded portion 14 and fully tightened to releasably secure all components of assembly 20 together. Although one nut 29 can be mated with threaded portion 14, it is preferred to mate two nuts 29 with threaded portion 14, as illustrated, since the latter mated nut tends to bind both nuts together thereby inhibiting any movement thereof due to, for example vibrations.

While the preferred embodiments have been fully described and depicted for the purpose of explaining the principles of the present invention, it will be appreciated by those skilled in the art that various modifications and changes may be made thereto without departing from the scope of the invention set forth in the appended claims.

I claim:
1. An assembly for locking a battery terminal against rotation with respect to a container from which the terminal extends, said assembly comprising:

a first means for registering with and engaging said container so as to prevent relative rotation between said first means and said container;

a second means for registering with and engaging said terminal so as to prevent relative rotation between said second means and said terminal; and means for releasable securing said first means to said second means, said first means and said second means engaging and cooperating to maintain said terminal and said container in a set position.

2. The assembly of claim 1 wherein said container has a substantially cylindrical hollow neck portion through which said terminal extends, said first means registering with an engaging said neck portion.

3. The assembly of claim 2 wherein said first means comprises a collar defining two faces and having an aperture therethrough and a first socket formed in one of said two faces.

4. The assembly of claim 3 wherein said neck portion has plurality of facets formed in and substantially uniformly spaced about the periphery of said neck portion and said first socket has a generally polygonal peripheral configuration, said facets being engaged within said socket.

5. The assembly of claim 1 wherein said second means registers with and engages a portion of said terminal which is threaded and has a generally sectorial cross-section configuration.

6. The assembly of claim 5 wherein said second means comprises a washer having a sectorial configured aperture therethrough, which is sized to permit said threaded portion of said terminal to be inserted therethrough.

7. The assembly of claim 6 wherein said first means comprises a collar defining two faces and having an aperture therethrough and a second socket formed in one of said two faces.

8. The assembly of claim 7 wherein said second socket has a generally polygonal peripheral configuration and said washer has a generally polygonal configuration which is sized to permit said washer to mate with said socket.

9. The assembly of claim 8 wherein said securing means comprising at least one nut mated with said threaded portion of said terminal.

10. The assembly of claim 9 wherein at least one washer is interposed between said securing means and said first and second means.

* * * * *